United States Patent [19]
Feldman et al.

[11] Patent Number: 5,881,153
[45] Date of Patent: Mar. 9, 1999

[54] REMOTE KEYLESS ENTRY ENCRYPTION ALGORITHM

[75] Inventors: Andrea M. Feldman, Farmington Hills; Steven R. Settles, Sterling Heights, both of Mich.

[73] Assignee: UT Automotive Dearborn, Inc., Dearborn, Mich.

[21] Appl. No.: 771,336

[22] Filed: Dec. 16, 1996

[51] Int. Cl.⁶ .............................. H04L 9/00; H04K 1/04
[52] U.S. Cl. .................. 380/28; 380/9; 380/23; 380/44; 380/46; 380/49; 340/825.31; 340/825.34
[58] Field of Search .................... 380/23, 9, 44, 380/46, 49; 340/825.31, 825.34

[56] References Cited

U.S. PATENT DOCUMENTS 5,506,905   4/1996   Markowski et al. .................. 380/25

FOREIGN PATENT DOCUMENTS 1-103042(A)   4/1989   Japan .............................. H04L 9/00

*Primary Examiner*—Eric W. Stamber
*Assistant Examiner*—Todd Jack
*Attorney, Agent, or Firm*—Ozer M. N. Teitelbaum

[57] ABSTRACT

The present invention teaches a method and system of encrypting a set of data having a test bit. The method comprises the step of generating a first and a second data string from the set of data. Once generated, the test bit is tested, and should it comprises a first value, the first data string is shifted in a first direction to transfer a carry over bit from a carry over register into the first data string while transferring a first bit of the first data string to said carry over register. This shifting step is followed by the step of shifting the second data string in a second direction to transfer a first bit of the second data string to the carry over register while transferring the carry over bit from the carry over register into the second data string. However, if the test bit comprises a second value, a first logic operation is executed on the first data string with a first number, and a second logic operation is executed on the second data string with a second number. Thereafter, the first data string is shifted in the second direction such that said carry over bit from said carry over register is transferred onto the first data string while the first bit of the first data string is transferred to the carry over register. Subsequently, the second data string is shifted in the first direction such that the carry over bit from the carry over register is transferred onto the second data string while the first bit of the second data string is transferred to the carry over register.

17 Claims, 2 Drawing Sheets

REMOTE KEYLESS ENTRY ENCRYPTION ALGORITHM

FIELD OF THE INVENTION

This invention relates to secure systems, generally, and more particularly a remote keyless entry encryption algorithm.

BACKGROUND OF THE INVENTION

In the automotive industry, remote keyless entry ("RKE") systems have become standard equipment on many new vehicles. Comprising a receiver within the car and a number of fob transmitters for transmitting a message to the receiver, RKE systems enable users to control several vehicle functions remotely, such as the door locks and trunk, for example.

In providing remote control to vehicle functions, a problem arises as to restricting remote access to the automobile's owners and other authorized users. To prevent unauthorized access, an identification system is incorporated with a security code or codes within both the fob transmitter and receiver. The receiver receives a transmitted signal having a command and and identification or security code and compares the received code with the security code stored in its memory. If the receiver determines the received security code to match the stored code, the command is initiated for execution.

As the demand for RKE systems has evolved in the marketplace, greater emphasis has been placed on increased security, reliability and flexibility. With the development of sophisticated electronics, presently, a transmitted message may be decoded and retransmitted at a later time. This is in part because in these known systems the transmitted message, does not change between transmissions.

As such, one area of focus has been the incorporation of encryption techniques to decrease the likelihood of unauthorized reception and retransmission of the originally transmitted signal comprising both the command and security code. Therefore, there is a demand for an encryption method designed specifically for RKE systems. Moreover, a need further exists for a RKE system which encrypts the transmitted message.

SUMMARY OF THE INVENTION

In order to achieve the advantages of the present invention, a method of encrypting a set of data having a test bit is disclosed. The method comprises the step of generating a first and a second data string from the set of data. Once generated, the test bit is tested, and if it comprises a first value, the first data string is shifted in a first direction to transfer a first bit of the first data string into a carry over register while transferring a first special bit into the first data string. This shifting step is followed by the step of shifting the second data string in a second direction to transfer the carry over bit from the carry over register into the second data string while transferring a first bit from the second data string to the carry over register. However, if the test bit comprises a second value, a first logic operation is executed on the first data string with a first number, and a second logic operation is executed on the second data string with a second number. Thereafter, the first data string is shifted in a third direction such that the first bit of the first data string is transferred to the carry over register while the carry over bit is transferred onto the first data string. Subsequently, the second data string is shifted in a fourth direction such that the first bit of the second data string is transferred to the carry over register while the carry over bit is transferred onto the second data string.

In a further embodiment of the present invention, a system is disclosed for encrypting a set of data having a test bit. The system comprises a first and a second storage device for storing a first and a second data string having a test bit, a carry over bit register for storing a carry over bit from the first and second storage devices, and memory for supplying a first and a second number. The system also comprises a microcomputer for testing the value of the test bit. In response to the test bit comprising a first value, the microcomputer shifts first data string in a first direction to transfer a first bit of the first data string into the carry over register, while transferring a first special bit into the first data string. Moreover, the microcomputer shifts the second data string in a second direction to transfer a first bit of the second data string to the carry over register while transferring the carry over bit into the second data string. However, if the test bit value comprises a second value, the microcomputer executes a first logic operation on the-first data string with a first number stored in a first memory location, and executes a second logic operation on the second data string with a second number stored in a second memory location. Subsequently, the microcomputer shifts first data string in a third direction such that the first bit of the first data string is transferred to the carry over register while the carry over bit is transferred onto the first data string. Furthermore, the microcomputer shifts the second data string modified by the second logic operation in a fourth direction such that the first bit of the second data string is transferred to the carry over register while carry over bit is transferred into the second data string. The microcomputer also comprises a decrementer for decrementing a counter each time the test bit equals either the first or second value. Furthermore, the microcomputer repeats the shifting of the first data string and the shifting of the second data string if the test bit comprises the first value, and the executing of the first logic operation on the first data string, the executing of the second logic operation on the second data string, setting the carry over bit, the shifting of the first data string, and the shifting of the second data string if the test bit comprises the second value, until said counter equals a preset number.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENT

Figure 1:
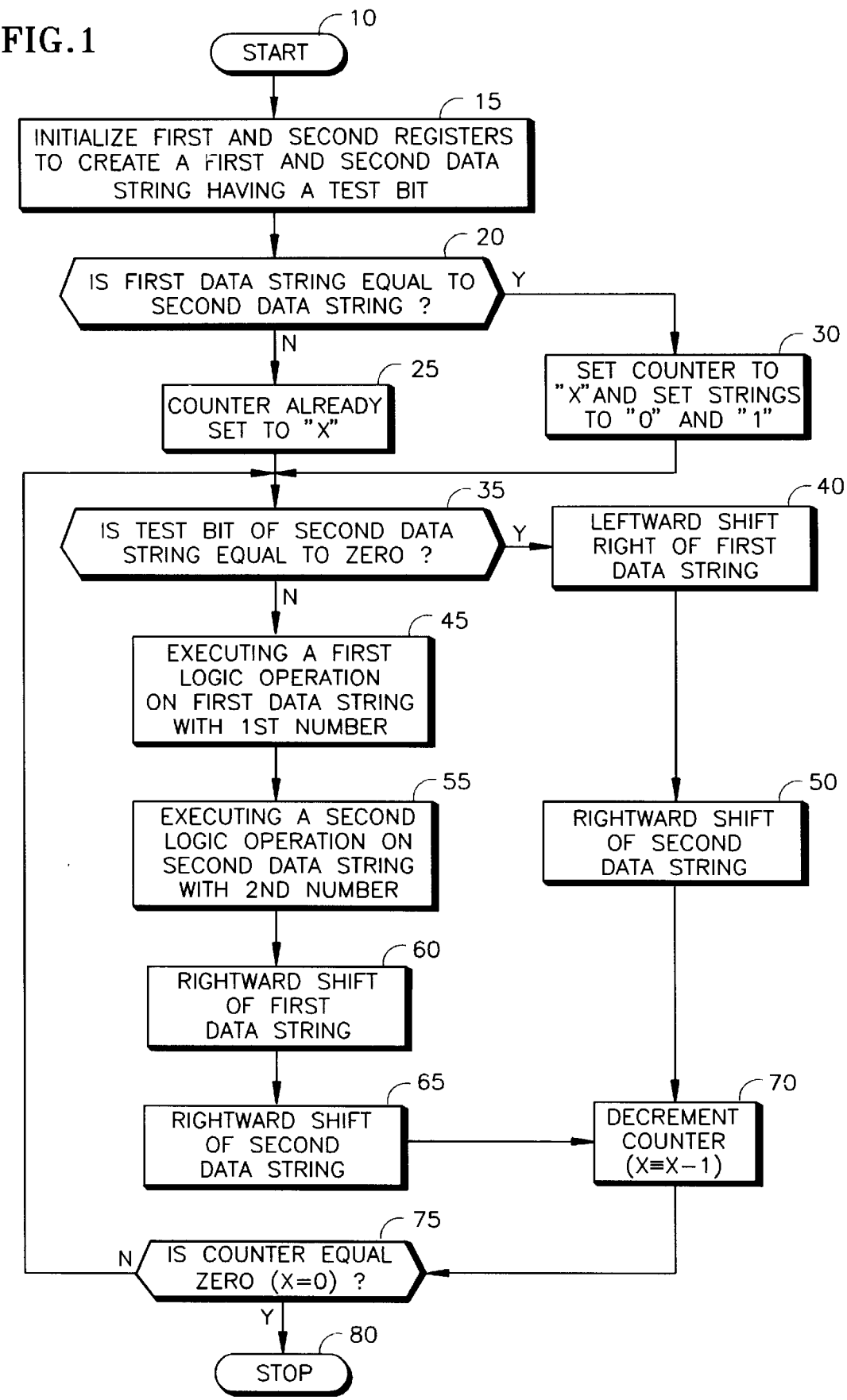
FIG. 1 illustrates a flow chart of a first embodiment of the present invention.

Referring to FIG. 1, a flow chart of a method of encrypting data transmitted by a transmitter and received by a receiver is illustrated. Upon initiating the algorithm (START 10), a first and a second register, preferably 16 bits wide, are initialized (INITIALIZE 15) to create a first and a second data string, respectively, having a test bit. In the preferred embodiment, the test bit comprises the lower order bit of the second data string. It should be apparent to one of ordinary skill in the art, however, that any bit on either data string may be employed in this regard.

Once both first and second registers are initialized, the algorithm tests (TEST 20) whether the first data string is identical to the second data string. In the event both data strings are not equivalent, the counter is already set to a predetermined number (COUNTER ALREADY SET 25). In the preferred embodiment, the predetermined number is 16. It should be apparent, nonetheless, that numbers other than 16 are also employable for the predetermined number.

If both data strings are deemed equivalent, however, a counter is set to the predetermined number (SET 30). Moreover, the first and second data strings may be set such that first data string is set to "1" while second data string remains unchanged. In the preferred embodiment, the second data string stores the predetermined number and the first data string stores the present value of the counter. It should also be apparent that the roles of the first and second data strings may be reversed.

Irrespective of whether the first data string is equivalent to second data string, both outcomes, upon acknowledging the counter's state or setting the counter (COUNTER ALREADY SET 25 or SET 30), result in a process step of determining whether the test bit is equal to zero (TEST BIT VALUE 35). In the event the test bit is set to zero, a leftward shift right (LEFT SHIFT RIGHT 40) is performed on the first data string. In the preferred embodiment, this leftward shift right further comprises the step of shifting the lower order bit of the first data string to a carry over register and shifting a first special bit into the high order bit position of the first data string. In the preferred embodiment, the first special bit is a zero bit.

Under the same conditions where the test bit value is equal to zero, following the leftward shift right (LEFT SHIFT RIGHT 40), a rightward shift is executed on the second string (RIGHT SHIFT 50). In the preferred embodiment of the present invention, this rightward shift further comprises the step of shifting the second data string to transfer the carry over bit from the carry over register into the high order bit position of the second data string, and transferring the low order bit of the second string to the carry over register.

After the first data string is shifted leftwards (SHIFT LEFT RIGHT 40) and the second data string is shifted rightwards (SHIFT RIGHT 50), the counter is decremented by one (DECREMENT COUNTER 70). At this point in the algorithm, a test is performed on the counter to determine whether the counter value is zero (COUNTER TEST 75). If the counter is zero, the method is complete (STOP 80) as both data strings are encrypted. On the other hand, if the counter is, not zero, process control of the algorithm is returned to the step of determining whether the test bit of the second data string is set to zero (TEST BIT VALUE 35) for the number of loops remaining as reflected by the counter.

A second process path the present algorithm provides is in the event the test bit of the second data string is not equal to zero, but rather one. Here, a first logic operation is performed on the first data string with a first set mask number (FIRST LOGIC OPERATION 45). Subsequent to executing the first logic operation on the first data string (FIRST LOGIC OPERATION 45), a second logic operation is performed on the second data string with a second set mask number (SECOND LOGIC OPERATION 55).

In the preferred embodiment, each of the logic operations detailed hereinabove, which are performed using a first and second mask to enable access to the first and second number, respectively, are stored in an electrically erasable programmable read only memory (EEPROM), is an EXCLUSIVE OR (XOR). However, in an alternate embodiment of the present invention, first and second masks need not be used nor must the storage source of the first number be an EEPROM. Moreover, other logic operations may be also be employed including a logic AND, NAND, OR and NOR operations.

Upon performing both logic operations (FIRST LOGIC OPERATION 45 and SECOND LOGIC OPERATION 55), the carry bit is set and a rightward shift is performed on the first data string (RIGHT SHIFT 60). In the preferred embodiment, this rightward shift further comprises the step of shifting the first data string as modified by the first logic operation rightward such that the carry over bit from the carry over register is transferred onto the high order bit of the first data string while the low order bit of the first data string is transferred to the carry over register.

Subsequent to completing the rightward shift (RIGHT SHIFT 60), a rightward shift is executed on the second string (RIGHT SHIFT 65). In the preferred embodiment, this rightward shift further comprises the step of shifting the second data string as modified by the second logic operation rightward such that the carry over bit from the carry over register is transferred onto the high order bit of the second data string and the low order bit of the second data string is transferred to the carry over register.

Once the first data string is shifted rightwards (SHIFT RIGHT 60) and the second data string is also shifted rightwards (SHIFT RIGHT 65), the counter is decremented by one (DECREMENT COUNTER 70). At this point in the algorithm, a test is performed on the counter to determine whether the counter value is zero (COUNTER TEST 75). If the counter is zero, both first and second data strings are deemed to be encrypted and the method is complete (STOP 80). On the other hand, if the counter is not zero, process control of the algorithm is returned to the step of determining whether, the test bit of the second data string is set to zero (TEST BIT VALUE 35) for the number of loops remaining as reflected by the counter.

Figure 2:
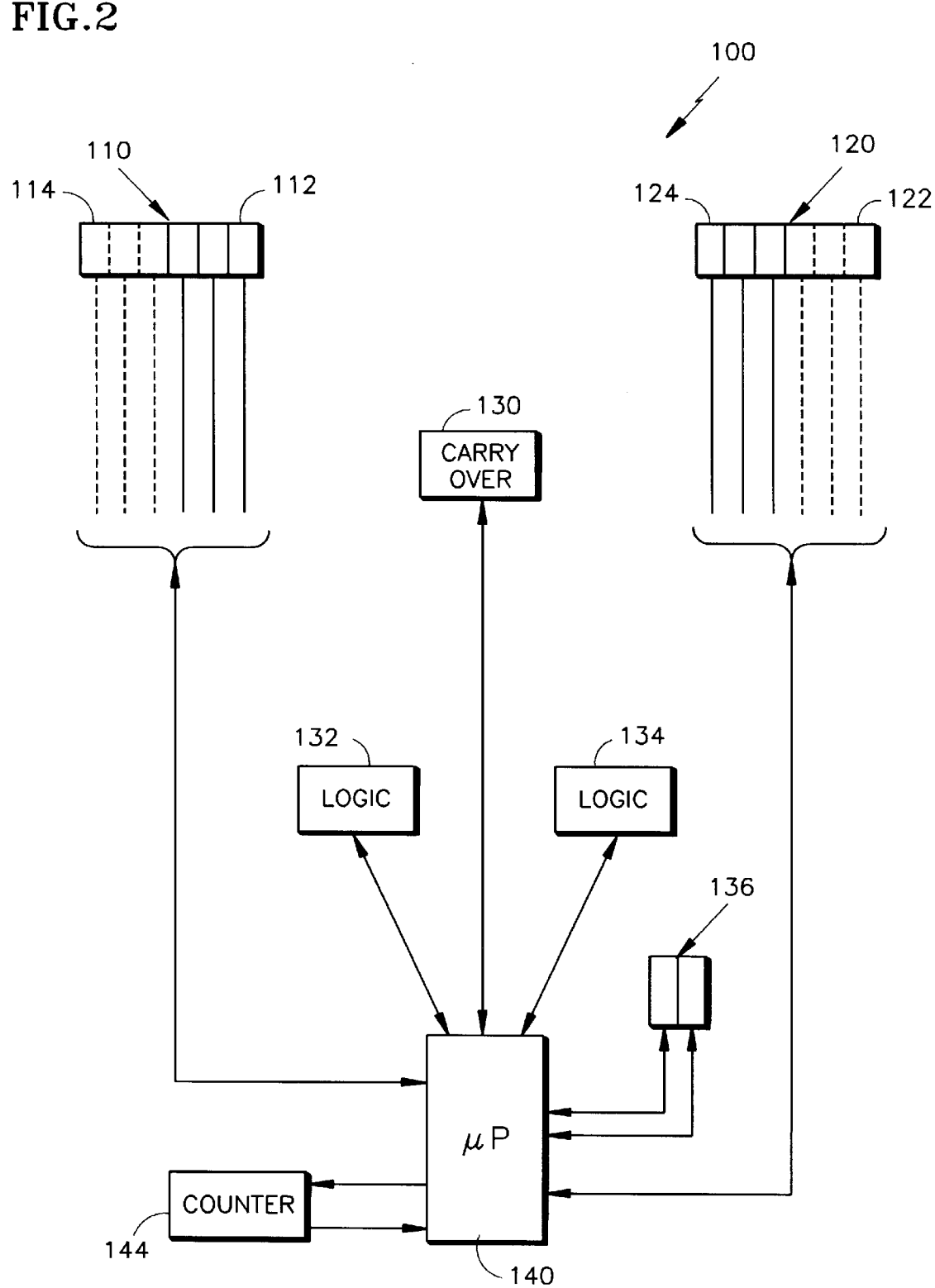
FIG. 2 illustrates a block diagram of a second embodiment of the present invention.

Referring to FIG. 2, a block diagram of a system 100 for encrypting data transmitted by a transmitter and received by a receiver is depicted. System 100 comprises a first and a second storage device, 110 and 120, each preferably a 16 bit wide random access memory register. Storage devices 110 and 120 functionally provide storage for a first and a second data string having a test bit. This test bit, as detailed hereinabove, preferably is realized by the low order bit 122 of second storage device 120.

Moreover, system 100 comprises a carry over register 130. Carry over register 130 stores a carry over bit from first and second storage registers, 110 and 120. To achieve this end, in one embodiment carry over register 130 is directly coupled with first and second storage registers, 110 and 120.

System 100 additionally comprises a microcomputer 140. Microcomputer 140 is coupled with first and second registers 110 and 120, a carry over register 130, a first and second logic device, 132 and 134, a memory 136 having a first and second location for storing a first and second number, and a counter 144. It should be noted that while each of the components are illustrated as discrete components, microcomputer 140 may comprise these internally, as a scaled integrated device.

Microcomputer 140 performs several functions. Firstly, microcomputer 140 test the value of the test bit. In response to the test bit being equal to a first value, microcomputer 140 initializes both first and second registers 110 and 120, and tests whether the first data string is identical to the second data string. In the event both data strings are not equivalent, a counter 144 is established as being already set to a predetermined number, preferably 16. Otherwise, should both data strings be equivalent, counter is set to 16.

Regardless of whether first data string is equivalent to second data string, both outcomes, upon acknowledging the counter's state or setting the counter, microcomputer 140 determines whether the test bit is equal to zero. In the event the test bit is set to zero, microcomputer 140 performs a leftward shift right operation on the first data string contained within second register 110. In the preferred embodiment, this leftward shift right further comprises the step of shifting the low order bit of the first data string to transfer a carry over bit stored in to the carry over register and a first special bit, preferably a zero bit, is inserted into the high order bit position of the first data string.

Under the same conditions where the test bit value is equal to zero, following the leftward shift right, the microcomputer 140 executes a rightward shift operation on second data string contained within second register 120. In the preferred embodiment of the present invention, this rightward shift further comprises the step of shifting the second data string to transfer the carry over bit from the carry over register into the high order bit position of the second data string, and transferring the low order bit of the second string to the carry over register.

Once the first data string is shifted leftwards and the second data string is shifted rightwards, microcomputer 140 decrements counter 144 by one. At this point in the algorithm, a test is performed on counter 144 to determine whether the counter value is zero. If counter 144 is zero, the method is complete as both data strings are encrypted. On the other hand, if counter 144 is not zero, process control of the algorithm by microcomputer 140 is returned to determining whether the test bit of the second data string contained within second register 120 is set to zero for the number of loops remaining as reflected by counter 144.

Microcomputer 140, on the other hand, operates along a second process path in the event the test bit of the second data string is not equal to zero, but rather one. Under these circumstances, microcomputer 140 executes a first logic operation using a first logic device 132 on the first data string contained within first register 110 with a first set mask number found in a first location of memory device 136. Subsequent to executing the first logic operation, a second logic operation using a second logic device 134 is performed by microcomputer 140 on the second data string contained within second register 120 with a second set mask number found in a second location of memory device 136.

As detailed hereinabove, in the preferred embodiment, each of the first and second logic operations are performed using a first and second mask to enable access to the first and second number, respectively, preferably stored in an electrically erasable programmable read only memory (EEPROM) 136, is an EXCLUSIVE OR (XOR). However, in an alternate embodiment of the present invention, first and second masks need not be used nor must the storage source of the first number be an EEPROM. Moreover, other logic operations may be also be employed including a logic AND, NAND, OR and NOR operations.

Upon performing both logic operations, microcomputer 140 performs a rightward shift on the first data string. In the preferred embodiment, this rightward shift further comprises the step of shifting the first data string as modified by the first logic operation rightward such that the carry over bit from the carry over register is transferred onto the high order bit of the first data string while the low order bit of the first data string is transferred to the carry over register.

After completing the rightward shift, a rightward shift is executed by microcomputer 140 on the second string. In the preferred embodiment, this rightward shift further comprises the step of shifting the second data string as modified by the second logic operation rightward such that the carry over bit from the carry over register is transferred onto the lwo order bit of the second data string and the high order bit of the second data string is transferred to the carry over register.

Once the first data string is shifted rightwards and the second data string is also shifted rightwards, microcomputer 140 decrements counter 144 by one. At this point in the algorithm, microcomputer 140 examines whether the counter value is zero. If the value residing in counter 144 is zero, first and second data strings are deemed by microcomputer 144 to be encrypted. On the other hand, if counter 144 is not zero, microcomputer 144 is returned to the step of determining whether the test bit of the second data string is set to zero for the number of loops remaining as reflected by the counter.

It should also be noted that reference to term message hereinabove shall mean either a single code set or, as in the preferred embodiment, a pair of code sets.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, it should be apparent to one of ordinary skill in the art that the security system of the present invention may be applied in conjunction with enclosed spaces which inhibit entry and/or exit such as a vehicle, door, building entrance, safe, desk drawer or jail cell, and the like. The invention detailed herein is, hence, applicable to other secured enclosed spaces or secured switching mechanisms requiring security for deterring theft. Moreover, the present invention is also applicable to key formats requiring the storage of personal or secured information thereon. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A method of encrypting a set of data having a test bit, the method comprising the steps of:
   generating a first and a second data string from the set of data;
   if the test bit comprises a first value,
      shifting said first data string in a first direction to transfer a carry over bit from a carry over register into said first data string while transferring a first bit of said first data string to said carry over register; and shifting said second data string in a second direction to transfer a first bit of said second data string to said carry over register while transferring said carry over bit from said carry over register into said second data string; and if the test bit comprises a second value, executing a first logic operation on said first data string with a first number;

executing a second logic operation on said second data string with a second number;

shifting said first data string modified by said first logic operation in said second direction such that said carry over bit from said carry over register is transferred onto said first data string while said first bit of said first data string is transferred to said carry over register; and shifting said second data string modified by said second logic operation in said first direction such that said carry over bit from said carry over register is transferred onto said second data string while said first bit of said second data string is transferred to said carry over register.

2. The invention of claim 1, further comprising the steps of:

counting each time the test bit equals said first or second value; and repeating said steps of shifting said first data string in a first direction and shifting said second data string in a second direction if the test bit comprises said first value, and executing said first logic operation on said first data string, executing said second logic operation on said second data string, shifting said first data string in said second direction, and shifting said second data string in said first direction if the test bit comprises said second value, until said number of times counted equal a preselected count number.

3. The invention of claim 1, wherein said step of generating a first and a second data string comprises the step of initializing at least one of said first and second data strings.

4. The invention of claim 1, wherein at least one of said first and second logic operations comprise at least one of an OR, AND, NOR, NAND, EX-OR logic functions.

5. The invention of claim 1, wherein at least one of said first and second logic operations are performed using a mask.

6. The invention of claim 1, wherein at least one of said first and second number comprise a number stored in memory.

7. A method of encrypting data transmitted by a transmitter and received by a receiver, the method comprising the steps of:

initializing a first and a second register creating a first and a second data string having a test bit;

if said test bit comprises a first value, shifting said first data string in a first direction to transfer a carry over bit from a carry over register into said first data string while transferring a first bit of said first data string to said carry over register; and shifting said second data string in a second direction to transfer a first bit of said second data string to said carry over register while transferring said carry over bit from said carry over register into said second data string;

if the test bit comprises a second value, executing a first logic operation on said first data string with a first number stored in a first memory location;

executing a second logic operation on said second data string with a second number stored in a second memory location;

shifting said first data string modified by said first logic operation in said second direction such that said carry over bit from said carry over register is transferred onto said first data string while said first bit of said first data string is transferred to said carry over register; and shifting said second data string modified by said second logic operation in said first direction such that said carry over bit from said carry over register is transferred onto said second data string while said first bit of said second data string is transferred to said carry over register;

decrementing a counter each time the test bit equals said first or second value; and repeating said steps of shifting said first data string in a first direction and shifting said second data string in a second direction if the test bit comprises said first value, and executing said first logic operation on said first data string, executing said second logic operation on said second data string, shifting said first data string in said second direction, and shifting said second data string in said first direction if the test bit comprises said second value, until said counter equals a preset number.

8. The invention of claim 7, wherein said first direction is leftwards, and said second direction is rightwards.

9. The invention of claim 7, wherein said test bit is the right most bit of said second data string.

10. The invention of claim 7, wherein at least one of said first and second logic operations comprise at least one of an OR, AND, NOR, NAND, EX-OR logic functions.

11. The invention of claim 7, wherein at least one of said first and second logic operations are performed using a mask.

12. A system for encrypting data transmitted by a transmitter and received by a receiver, the system comprising:

a first and a second storage device for storing a first and a second data string having a test bit;

a carry over bit register for storing a carry over bit from said first and second storage devices;

memory for supplying a first and a second number;

a microcomputer for testing the value of said test bit, and if said test bit comprises a second value, for shifting said first data string in a first direction to transfer a carry over bit from a carry over register into said first data string while transferring a first bit of said first data string to said carry over register; and for shifting said second data string in a second direction to transfer a first bit of said second data string to said carry over register while transferring said carry over bit from said carry over register into said second data string;

if said test bit comprises a second value, for executing a first logic operation on said first data string with a first number stored in a first memory location;

for executing a second logic operation on said second data string with a second number stored in a second memory location;

for shifting said first data string modified by said first logic operation in said second direction such that said carry over bit from said carry over register is transferred onto said first data string while said first bit of said first data string is transferred to said carry over register; and for shifting said second data string modified by said second logic operation in said first direction such that said carry over bit from said carry over register is transferred onto said second data string while said first bit of said second data string is transferred to said carry over register;

for decrementing a counter each time the test bit equals said first or second value; and for repeating said shifting said first data string in a first direction and said shifting said second data string in a second direction if the test bit comprises said first value, and said executing said first logic operation on said first data string, said executing said second logic operation on said second data string, said shifting said first data string in said second direction, and said shifting said second data string in said first direction if the test bit comprises said second value, until said counter equals a preset number.

13. The invention of claim 12, wherein said first direction is leftwards, and said second direction is rightwards.

14. The invention of claim 12, wherein said test bit is the right most bit of said second data string.

15. The invention of claim 12, wherein at least one of said first and second logic operations comprise at least one of an OR, AND, NOR, NAND, EX-OR logic functions.

16. The invention of claim 12, wherein at least one of said first and second logic operations are performed using a mask.

17. The invention of claim 10, wherein at least one of said first and second storage devices comprise a memory cell in electrically erasable programmable read only memory.

* * * * *

UNITED STATES PATENT AND TRADEMARK OFFICE
CERTIFICATE OF CORRECTION

PATENT NO. : 5,881,153
DATED : Mar. 9, 1999
INVENTOR(S) : Andrea M. Feldman and Steven R. Settles It is certified that error appears in the above-identified patent and that said Letters Patent is hereby corrected as shown below:

In Column 7, line 23: "invention" should be --method--.

In Column 7, line 37: "invention" should be --method--.

In Column 7, line 40: "invention" should be --method--.

In Column 7, line 43: "invention" should be --method--.

In Column 7, line 46: "invention" should be --method--.

In Column 8, line 28: "invention" should be --system--.

In Column 8, line 30: "invention" should be --system--.

In Column 8, line 32: "invention" should be --system--.

UNITED STATES PATENT AND TRADEMARK OFFICE
CERTIFICATE OF CORRECTION

PATENT NO. : 5,881,153
DATED : Mar. 9, 1999
INVENTOR(S) : Andrea M. Feldman and Steven R. Settles It is certified that error appears in the above-identified patent and that said Letters Patent is hereby corrected as shown below:

In Column 8, line 35: "invention" should be ---system---.

In Column 10, line 3: "invention" should be ---system---.

In Column 10, line 5: "invention" should be ---system---.

In Column 10, line 7: "invention" should be ---system---.

In Column 10, line 10: "invention" should be ---system---.

In Column 10, line 13: "invention" should be ---system--- and "claim 10" should be ---claim 12---.

Signed and Sealed this

Sixth Day of July, 1999

Attest:

Attesting Officer

Q. TODD DICKINSON

Acting Commissioner of Patents and Trademarks